(12) United States Patent
Hiesl et al.

(10) Patent No.: US 12,054,092 B2
(45) Date of Patent: Aug. 6, 2024

(54) APPARATUS AND METHOD FOR RELEASABLY ATTACHING A TAIL LIGHT

(71) Applicant: Dr. Ing. h.c. F. Porsche Aktiengesellschaft, Stuttgart (DE)

(72) Inventors: Gerald Hiesl, Herrenberg-Oberjesingen (DE); Thomas Weiß, Calw-Heumaden (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 18/493,905

(22) Filed: Oct. 25, 2023

(65) Prior Publication Data

US 2024/0174167 A1   May 30, 2024

(30) Foreign Application Priority Data

Nov. 30, 2022   (DE) ...................... 10 2022 131 666.1

(51) Int. Cl.
*B60Q 1/26* (2006.01)

(52) U.S. Cl.
CPC .......... *B60Q 1/263* (2013.01); *B60Q 1/2626* (2013.01); *B60Q 1/2638* (2013.01)

(58) Field of Classification Search
CPC ..... B60Q 1/263; B60Q 1/2626; B60Q 1/2638
See application file for complete search history.

(56) References Cited

U.S. PATENT DOCUMENTS

| | | | |
|---|---|---|---|
| 7,967,487 B2 * | 6/2011 | Ballinger | B60Q 1/0064 |
| | | | 362/546 |
| 8,591,086 B2 | 11/2013 | Rinklin | |
| 2017/0327156 A1 | 11/2017 | Tsumiyama et al. | |
| 2019/0071000 A1 * | 3/2019 | Conley | B60Q 1/2638 |
| 2022/0111787 A1 * | 4/2022 | Pencak | B62D 33/0273 |

FOREIGN PATENT DOCUMENTS

| | | |
|---|---|---|
| DE | 102006027460 A1 | 12/2007 |
| DE | 102007008489 A1 | 9/2008 |
| DE | 102008012667 A1 | 9/2009 |
| DE | 102009042415 A1 | 3/2011 |
| DE | 102016211992 A1 | 1/2018 |
| DE | 102018122713 A1 | 3/2020 |
| FR | 2946609 A1 | 12/2010 |
| FR | 3086034 A1 | 3/2020 |

* cited by examiner

*Primary Examiner* — Thomas M Sember
(74) *Attorney, Agent, or Firm* — Buchanan Ingersoll & Rooney, PC

(57) ABSTRACT

An apparatus for releasably attaching a tail light to a vehicle body of a motor vehicle. The tail light is or becomes connected to the vehicle body in an interlocking manner on at least two interlocking connection points. In order to simplify the releasable attachment of the tail light, the tail light is connected to the vehicle body by way of at least one latching connection in addition to the interlocking connection points in order to establish the tail light in an assembled position in all spatial directions.

19 Claims, 5 Drawing Sheets

APPARATUS AND METHOD FOR RELEASABLY ATTACHING A TAIL LIGHT

CROSS-REFERENCE TO RELATED APPLICATION

This application claims priority to German Patent Application No. 10 2022 131 666.1, filed Nov. 30, 2022, the content of such application being incorporated by reference herein in its entirety.

FIELD OF THE INVENTION

The invention relates to an apparatus and a method for releasably attaching a tail light to a vehicle body of a motor vehicle, whereby the tail light is or becomes connected advantageously attached to the vehicle body in an interlocking manner on at least two interlocking connection points.

BACKGROUND OF THE INVENTION

DE 10 2018 122 713 A1, which is incorporated by reference herein, discloses a tail light of a motor vehicle assembled on a motor vehicle body on which, during the assembly process, the tail light is first preassembled on the motor vehicle body in an interlocking manner, whereby a displacement in at least one spatial direction is still possible, and then finally fixed via screws. French disclosure FR 3 086 034 A1, which is incorporated by reference herein, discloses a an assembly arrangement for assembling a tail light on a motor vehicle body. German disclosure document DE 10 2009 042 415 A1, which is incorporated by reference herein, discloses a headlight of a motor vehicle which is preassembled to be connected an interlocking manner during the assembly process on a holding element attached to a body-shell, whereby a plurality of holding means for the headlights are inserted into a counter-holding means of the holding element in the longitudinal direction of the motor vehicle. German disclosure document DE 10 2006 027 460 A1, which is incorporated by reference herein, discloses an apparatus for attaching and aligning a lamp unit to a motor vehicle, comprising a holding device for guiding the housing of the lamp unit into an assembled position, the housing being latched to the holding apparatus via a locking device and, in the assembled position, the lamp unit being alignable with respect to three orthogonal orientations relative to an opening in the vehicle body. German disclosure publication DE 10 2016 211 992 A1, which is incorporated by reference herein, discloses a method for preassembly of a tail light of a motor vehicle on a motor vehicle body, whereby the tail light is releasably fixed in a pre-adjustment state and is finally readjusted.

SUMMARY OF THE INVENTION

An apparatus for releasably attaching a tail light to a body of a motor vehicle in which the tail light being is connected to the vehicle body in an interlocking manner on at least two interlocking connection points. The tail light is connected to the vehicle body in addition to the interlocking points using at least one latching connection in order to establish the tail light in an assembly position in all spatial directions. In the context of attaching the tail light to the vehicle body, the term "releasable" means that the tail light is or becomes repeatedly non-destructively separable attached to the vehicle body. By combining the interlocking connection points with the latching connection, the tail light is clearly positioned and established in all spatial directions during assembly. The spatial directions include a vehicle longitudinal direction, also referred to as the x direction, a cross vehicle direction, also referred to as the y direction, and a vehicle height direction, also referred to as the z direction. By establishing the tail light in all three spatial directions, the assembly, in particular a final attachment process in the context of the assembly, is significantly simplified. During the final attachment process, the tail light, which is established on the vehicle body in all three spatial directions, is fixed stably to the vehicle body using additional attachment means, e.g. screws. Doing so ensures that the tail light remains fixedly connected to the vehicle body during operation of the vehicle.

One preferred embodiment of the apparatus is characterized in that the latching connection comprises a snap hook which extends from the vehicle body and is movable by way of a snap hook end in order to establish or release the latching connection. Doing so significantly simplifies both assembly and disassembly of the tail light. When assembling the tail light, the snap hook advantageously snaps in without the use of assembly aids for establishing the latching connection. During disassembly, a force can be specifically applied to the snap hook end to release the latching connection using an assembly aid, e.g. a screwdriver.

A further preferred embodiment of the apparatus is characterized in that the snap end comprises a latching surface which cooperates with a holding surface on the tail light in order to establish the tail light, in which case the both the latching surface on the snap end and the holding surface on the tail light are arranged obliquely to an assembly direction such that the tail light is biased to its assembled position by a snap-fit movement of the snap end. During assembly, the tail light is particularly advantageously pulled into its assembled position by the snap-fit movement of the snap hook or by a corresponding pre-tension of the snap hook. The assembly direction substantially corresponds to the longitudinal vehicle direction or the x direction. During assembly, the tail light is, e.g., a one-handed assembly force is merely applied in the assembly direction in order to establish the latching connection.

A further preferred embodiment of the apparatus is characterized in that a movement area, within which the snap hook end of the snap hook is movable during the achievement and release of the latching connection, is delimited by a stop surface on the vehicle body side. Damage to the snap hook, in particular a breakage of the snap hook during assembly and in particular also during disassembly of the tail light is advantageously provided thereby.

A further preferred embodiment of the apparatus is characterized in that the tail light is additionally fixed in its assembled position by way of at least two screw connections. The screw connections also fix the tail light to the vehicle body during operation of the motor vehicle.

A further preferred embodiment of the apparatus is characterized in that at least one of the screw connections, on which tail light the latching connection is also arranged, enables fixation in a vehicle height direction. Using this screw connection, a fixation transverse to a line of action of a holding force provided with the latching connection is preferably enabled. The release of an undesirable load on the latching connection during operation of the motor vehicle with the tail light assembled is then reliably prevented. The holding force of the latching connection preferably acts in the longitudinal direction of the vehicle or x direction.

A further preferred embodiment of the apparatus is characterized in that the tail light comprises a centering body projecting in the longitudinal vehicle direction, which, in addition to having a cruciform cross-section, is equipped with a stop surface effective in the longitudinal vehicle direction. In combination with the latching connection, a defined attachment in the longitudinal direction of the vehicle is thereby enabled.

One further preferred embodiment of the apparatus is characterized in that the tail light, at one end facing away from the latching connection, comprises a holding fork, using which the tail light is held on the vehicle body in a limited pivotal manner during assembly. This significantly simplifies the achievement and release of the latching connection during the assembly and disassembly of the tail light.

In a method for releasably attaching a tail light to a body of a motor vehicle, in which the tail light is connected to the vehicle body in an interlocking manner on at least two interlocking connection points, in particular using an apparatus described hereinabove. The tail light is connected to the vehicle body by way of at least one latching connection in addition to the interlocking connection points in order to establish the tail light in an assembled position in all spatial directions before the tail light is fixed to the vehicle body in the assembled position using attachment means, e.g. screws. During assembly, the tail light is initially established and fixed on the vehicle body only using the interlocking connection points and the latching connection. However, this determination and fixation is not sufficient to ensure an undesirable release of the tail light from the vehicle body during operation of the motor vehicle. The tail light is therefore additionally fixed to the vehicle body with the aid of the attachment means.

The invention further relates to a tail light, in particular to a lamp housing, a housing body, and/or a vehicle body, in particular to a rear cladding, a holding bar, and a vehicle body part for an apparatus described hereinabove. The specified parts can be purchased separately.

The invention optionally also relates to a motor vehicle with a tail light that is releasably attached to the vehicle body using an apparatus described hereinabove and/or according to a method described hereinabove.

BRIEF DESCRIPTION OF THE DRAWINGS

Further advantages, features, and details of the invention arise from the following description, in which various embodiment examples of the invention are described in detail with reference to the drawings. Shown are.

DETAILED DESCRIPTION OF THE INVENTION

Figure 1:
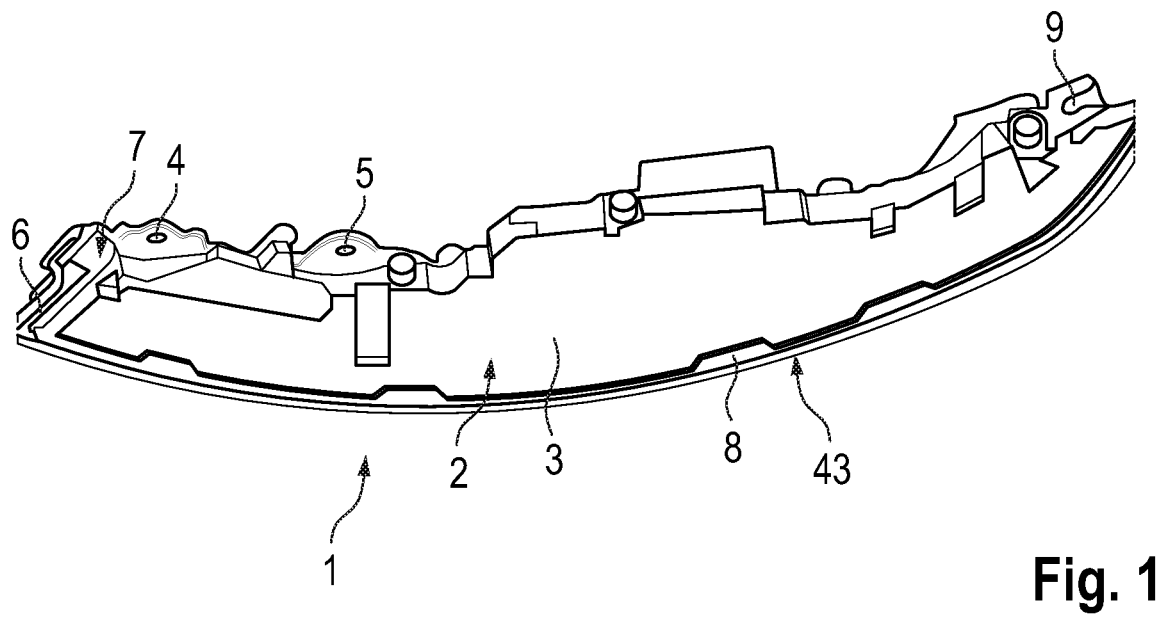
FIG. 1 is a perspective view of a tail light for attachment to a body of an automotive vehicle.

In FIG. 1, a tail light 1 is shown perspectively. The tail light 1 is designed in multiple parts comprising a lamp housing 2 and at least one housing body 3. The housing body 3 comprises two suction attachment means 4, 5 for the final fixation of the tail light in its assembled state.

Figure 4:
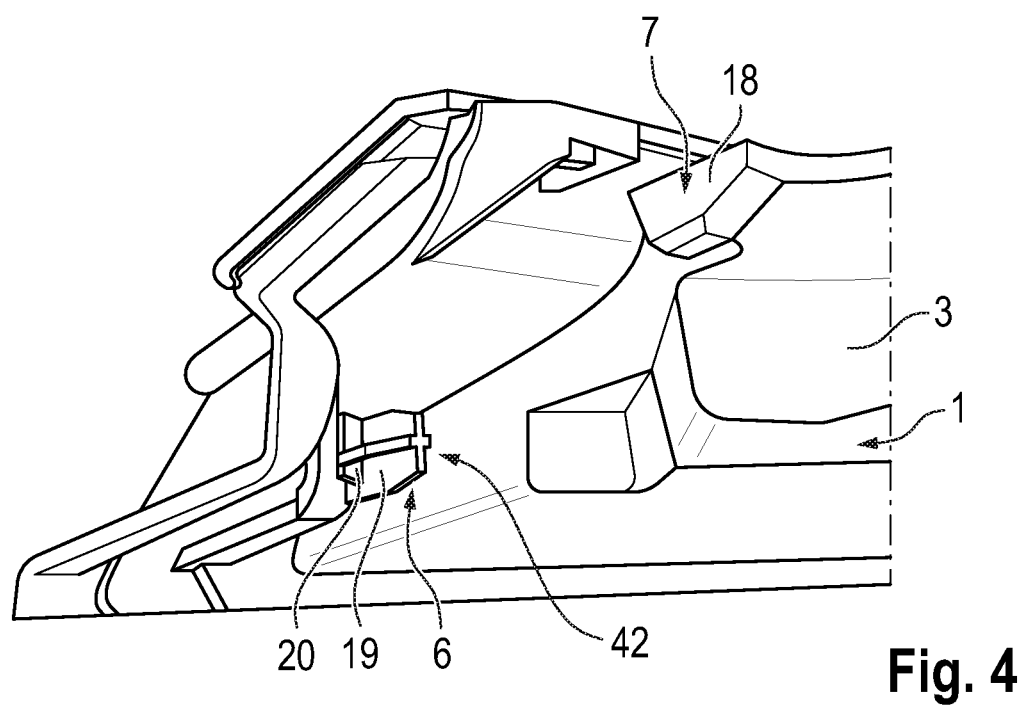
FIG. 4 is an enlarged perspective view of an end of the tail light with a centering body and a latching element.

A centering body 6, which is shown enlarged in FIG. 4, is formed on a left end of the housing body 3 of the tail light in FIG. 1. It can be seen in FIG. 4 that the centering body 6 has a cross-section 19. The cross-sectional section 19 on the centering body 6 is used to establish the tail light 1 in a cross-vehicle direction, also referred to as the y direction, and in a vehicle height direction, also referred to as the z direction relative to the vehicle body. In addition, the centering body 6 is combined with a stop surface 20. The stop surface 20 is also used during assembly to position the tail light on the vehicle body in a longitudinal vehicle direction, which is referred to as the x direction.

At a lower edge in FIG. 1, the lamp housing 2 of the tail light 1 comprises a plurality of ribs 8. The ribs 8 are also used to affix the tail light 1 when assembled on the vehicle body. Moreover, it is seen in FIG. 1, that the tail light 1 has a holding fork 9 on its right end in FIG. 1 on the housing body 2. The holding fork 9, when the tail light 1 is assembled on the vehicle body, is used to first establish the tail light 1 on the vehicle body at the beginning of assembly, whereby the holding fork 9 enables limited movements, in particular pivoting movements, during further assembly of the tail light 1.

Figure 2:
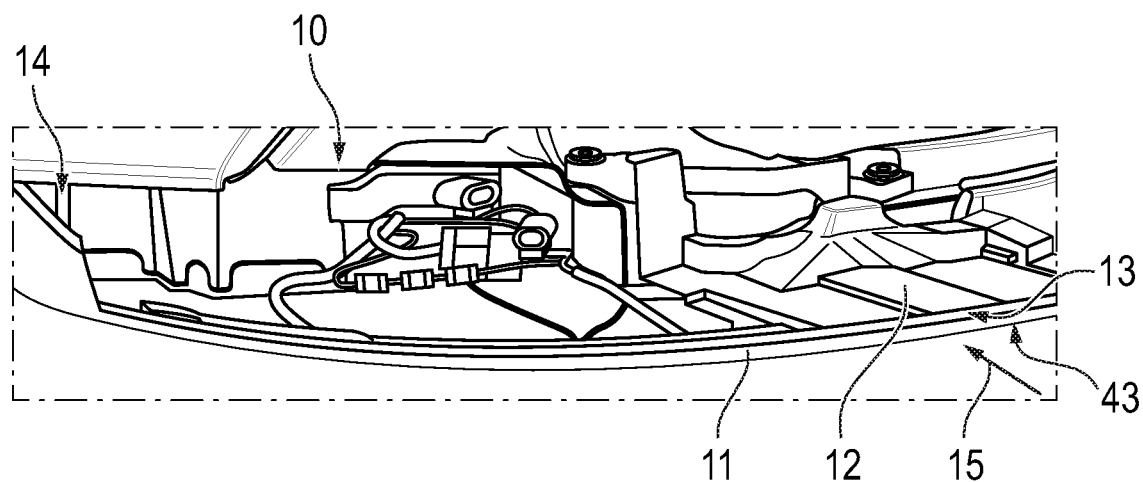
FIG. 2 is a perspective view of the body of the motor vehicle.

In FIG. 2, a part of a vehicle body 10 of an automotive vehicle is shown perspectively. The vehicle body 10 comprises a rear cladding 11, to which a holding bar 12 is attached. The rear cladding 11 is designed in multiple pieces and, e.g., comprises a vehicle body part 23 in addition to the holding bar 12. The vehicle body part 23 is, e.g., a visible faceplate with lettering at the rear of the vehicle.

Figure 3:
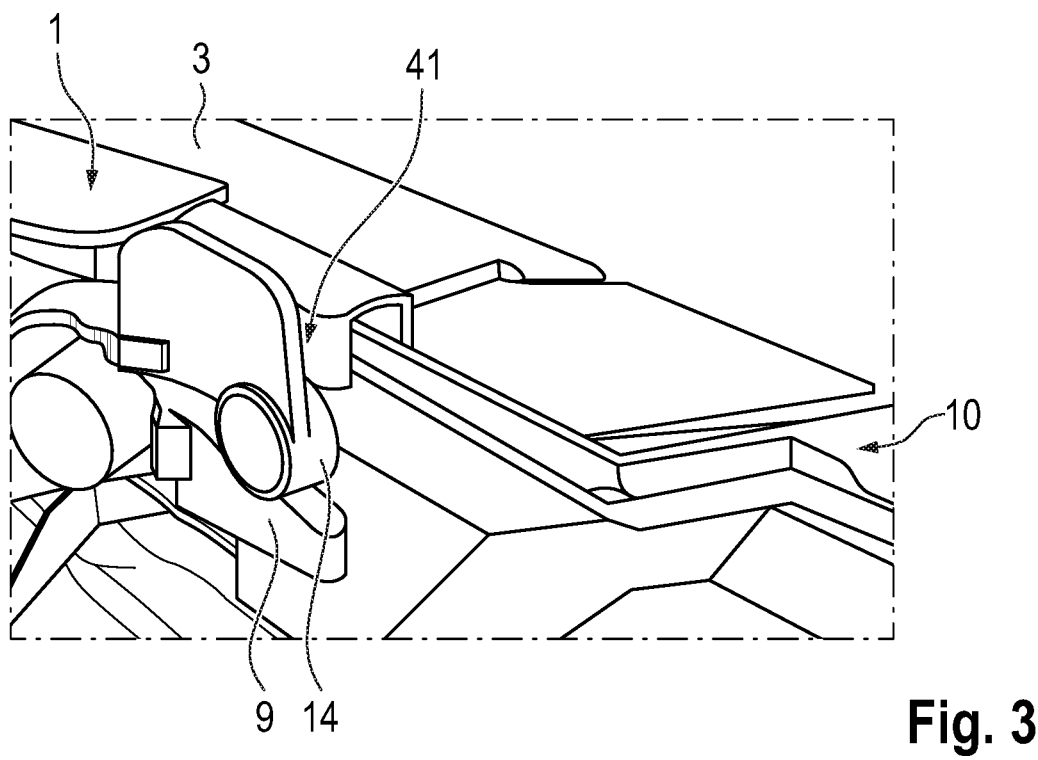
FIG. 3 is an enlarged perspective view of an assembled connection, in which one end of the tail light is attached to the vehicle body in a limited movable manner.

As shown in FIG. 2, receptacles 13 are provided between the rear cladding 11 and the holding bar 12 for insertion of the ribs 8 during assembly of the tail light 1. During assembly, however, the tail light 1 (as described hereinabove) is first attached to an assembly body 14 by way of the holding fork 9, as seen in FIG. 3. The attachment of the tail light 1 comprising the holding fork 9 to the assembly body 14 represents an assembled connection 41.

Following achievement of the assembled connection 41, the lamp housing 2 of the tail light 1 comprising the ribs 8 formed on the housing body 3 is inserted into the receptacles 13 on the vehicle body 10. In FIG. 2, an arrow 15 illustrates the vehicle longitudinal direction or x direction. The insertion of the ribs 8 into the receptacles 13 is preferably performed substantially in the longitudinal vehicle direction 15.

In FIG. 4, it can be seen that a latching element 18 is formed on the housing body 3 of the tail light 1 in addition to the centering body 6. The latching element 18 is used to represent a latching device 7 which, as can be seen in FIG. 1, is provided on an end of the tail light 1 facing away from the holding fork 9. The function of the latching device 7 is explained hereinafter with reference to FIGS. 6 to 10.

Figure 6:
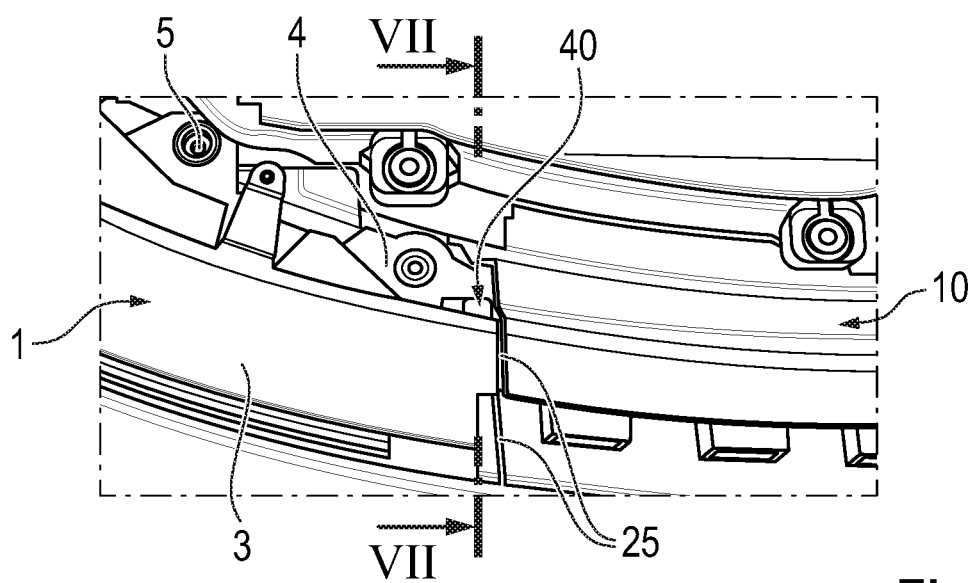
FIG. 6 is an enlarged perspective view of a detail of the tail light assembled on the vehicle body.

In FIG. 6, it can be seen that a groove 25 is visible between the assembled tail light 1 and the vehicle body. Therefore, the interstice 25 is critical with regard to the appearance of the motor vehicle equipped with the tail light 1. By combining two interlocking connection points 42, 43 with a latching connection 40, the interstice 25 can be performed with a high degree of precision and accuracy when assembling the tail light 1 on the vehicle body 10.

Figure 5:
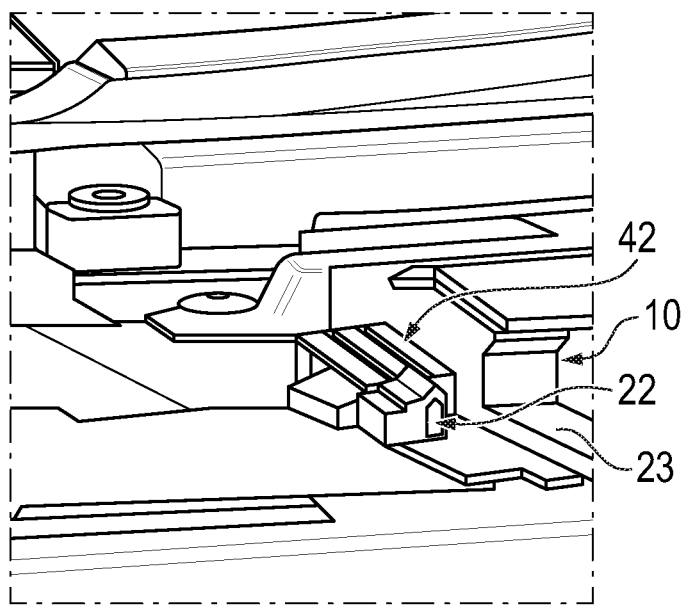
FIG. 5 is an enlarged perspective view of a detail of the vehicle body with a centering receptacle for the centering body shown in FIG. 4.

As can be seen in FIGS. 4 and 5, the interlocking connection point 42 is achieved using the centering body 6 received in the centering receptacle 22. As can be seen in FIGS. 1 and 2, the interlocking connection point 43 is achieved by way of the ribs 8 inserted into the receptacles 13.

Figure 7:
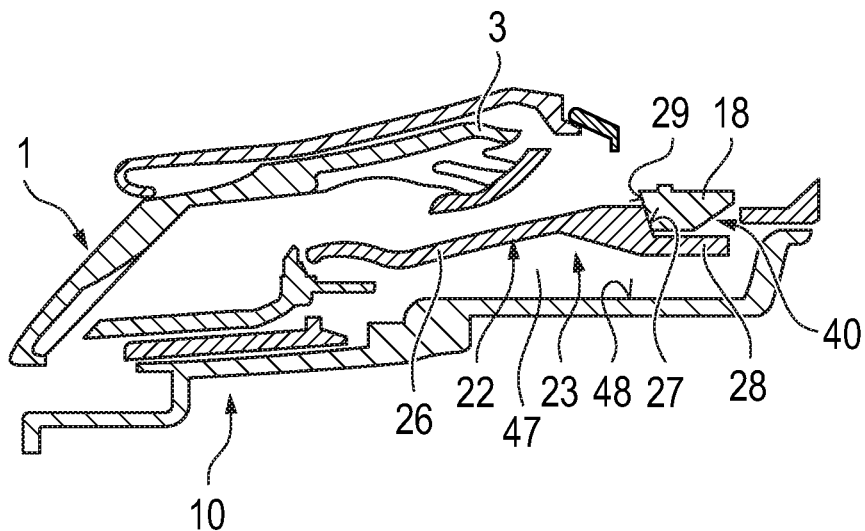
FIG. 7 shows a view of a section along line VII-VII in FIG. 6.
Figure 10:
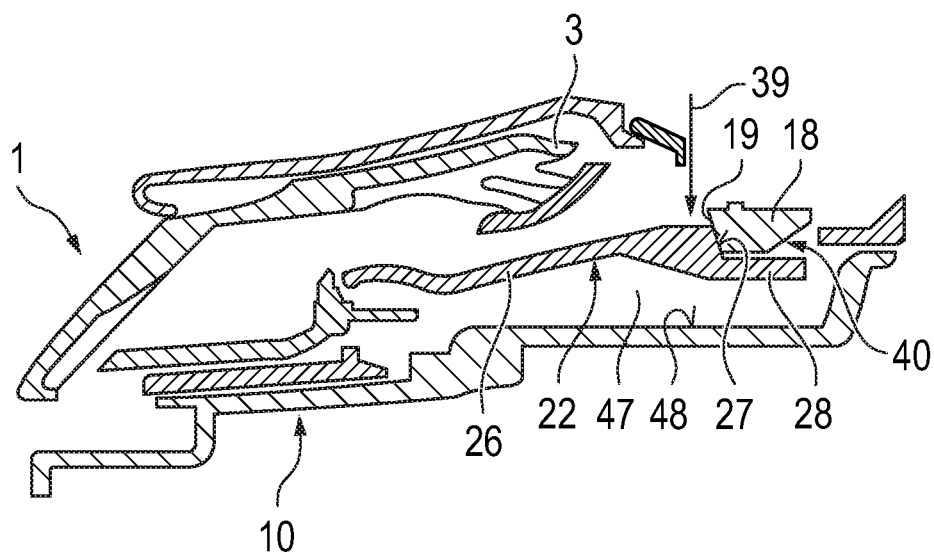
FIG. 10 is the sectional view in FIG. 7 with an arrow indicating the application of an assembly force for releasing the latching connection.

The latching connection 40 is achieved by way of a snap hook 26 which is formed on the vehicle body part 23, as shown in FIGS. 7 and 10. The snap hook 26 is movable at a snap hook end 28 within a movement area 47. A downward movement of the snap hook end 28 in FIGS. 7 and 10 is delimited by a stop surface 48 on the vehicle body side.

The snap hook end 28 of the snap hook 26 is provided with a latching surface 27. In order to show the latching connection 40, the latching surface 27 is associated with a holding surface 29 on the latching element 18 formed on the tail light 1.

Figure 8:
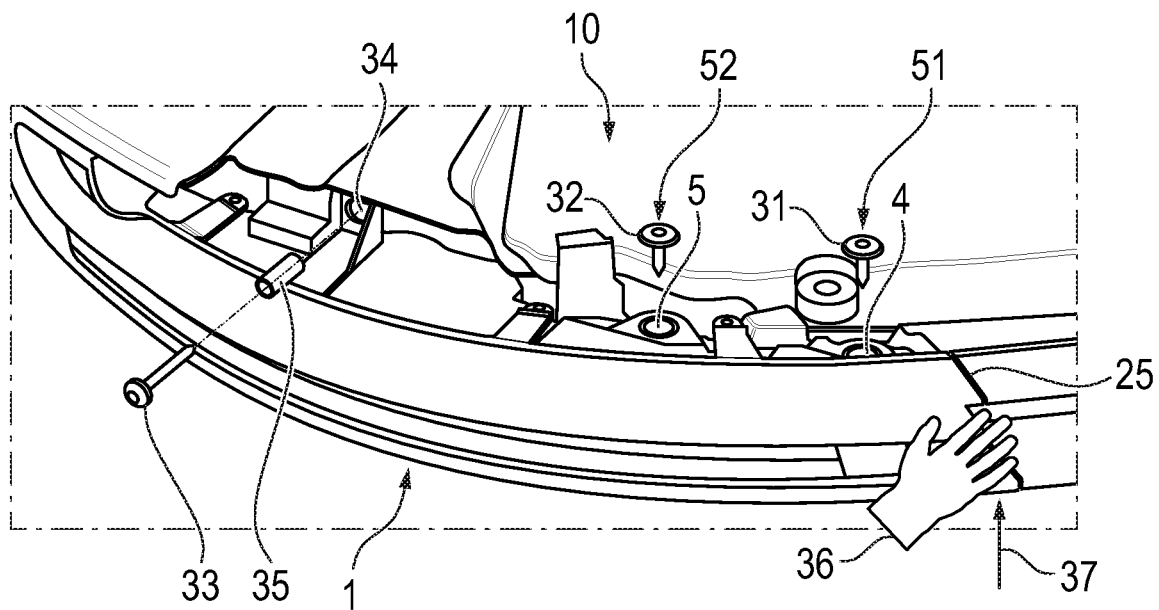
FIG. 8 is a perspective view illustrating the assembly of the tail light to the vehicle body.

In FIG. 8, a hand icon 36 illustrates how the latching connection 40 is achieved by applying a force in an assembly direction 37 to the tail light 1. The assembly direction 37 substantially corresponds to the vehicle longitudinal direction or the x direction. The tail light 1 is defined in all three spatial directions with the aid of the centering body 6 in the centering receiver 22 on the inside of the vehicle body 10. Thus, upon closing the latching connection 40, the tail light 1 is effectively established on the vehicle body 10.

The tail light 1 is then fixed to the vehicle body 10 in a stable manner using three screws 31, 32, 33. The screw 31 is screwed into the vehicle body 10 in the z direction through the suction attachment means 4. The screw 32 is also screwed into the vehicle body 10 in the z direction through the suction attachment means 5. Corresponding screw holes in the vehicle body are preferably designed as interference holes. Body tolerances can thus be balanced.

The screw 33 is screwed into the vehicle body 10 by way of a sleeve 35 through a round hole 34 transverse to the z direction. The oblong hole 34 in combination with the sleeve 35 enables a freedom of movement that ensures the assembly of the tail light 1 in different motor vehicle variants.

Figure 9:
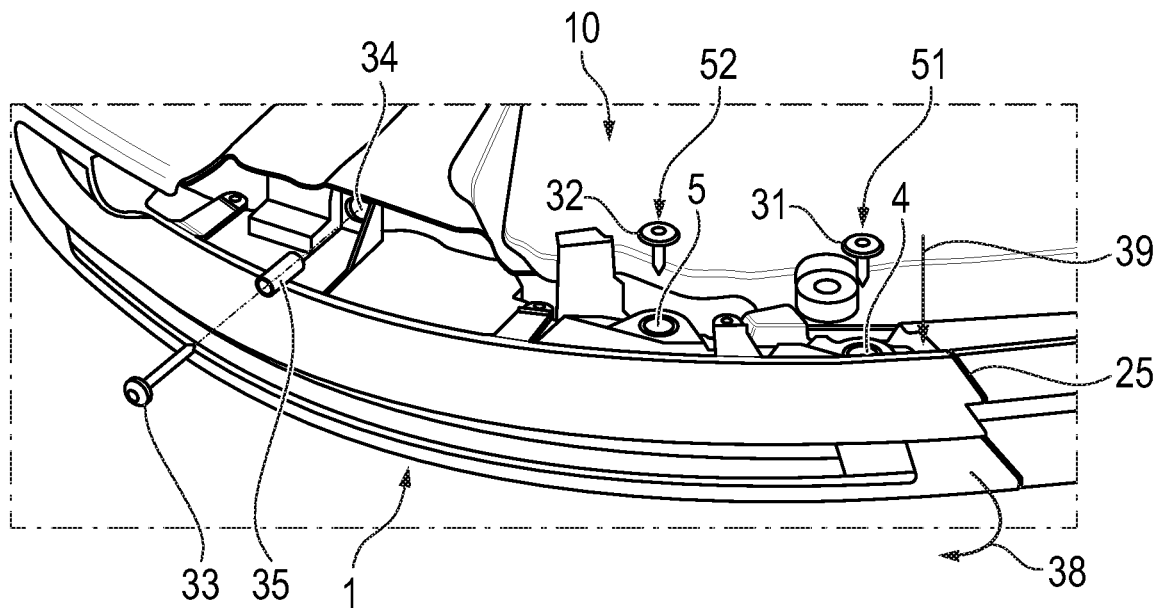
FIG. 9 is a similar illustration as in FIG. 8 illustrating the disassembly of the tail light.

In FIGS. 9 and 10, disassembly of the tail light 1 is illustrated. During disassembly, the screws 31, 32, 33 are first removed, then the sleeve 35 is removed. Then, as indicated in FIGS. 9 and 10 by an arrow 39, the latching connection 40 is released by applying a force from above to the snap hook 26 using a suitable tool, e.g. a screwdriver.

The stop surface 48 thereby limits downward movement of the snap end 28. Thus, overloading, in particular breaking off, of the snap hook 26 is reliably prevented when the latching connection 40 is released. After releasing or opening the latching connection 40, the tail light 1 can be pivoted outwardly (as indicated by an arrow 38 in FIG. 9) and removed from the vehicle body 10.

REFERENCE CHARACTERS

1 Tail light
2 Lamp housing
3 Housing body
4 Suction attachment means
5 Suction attachment means
6 Centering body
7 Latching device
8 Ribs
9 Holding fork
10 Vehicle body
11 Rear cladding
12 Holding bar
13 Receptacle
14 Assembly body
15 Arrow/vehicle longitudinal direction
18 Latching element
19 Cross-sectional shape
20 Stop surface
22 Centering receptacle
23 Vehicle body part
25 Interstice
26 Snap hook
27 Latching surface
28 Snap hook end
29 Holding surface
31 Screw
32 Screw
33 Screw
34 Oblong hole
35 Sleeve
36 Hand symbol
37 Assembly direction
38 Arrow
39 Arrow
40 Latching connection
41 Assembled connection
42 Interlocking connection point
43 Interlocking connection point
47 Movement area
48 Stop surface
51 Screw connection
52 Screw connection

What is claimed is:

1. An apparatus for releasably attaching a tail light to a vehicle body of a motor vehicle, said apparatus comprising:
   at least two interlocking connection points for connecting the tail light to the vehicle body in an interlocking manner, and
   at least one latching connection for connecting the tail light to the vehicle body, in addition to the at least two interlocking connection points, in order to establish the tail light in an assembled position in all spatial directions,
   wherein the latching connection comprises a snap hook extending from the vehicle body and movable with a snap hook end to either establish or release the latching connection,
   wherein the tail light, at one end facing away from the latching connection, comprises a holding fork, by way of which the tail light is held on the vehicle body in a limited pivotable manner during assembly.

2. The apparatus according to claim 1, wherein the snap hook end comprises a latching surface, which cooperates with a holding surface on the tail light in order to establish the tail light, wherein both the latching surface and the holding surface are arranged obliquely to an assembly direction on the snap hook end and the holding surface on the tail light such that the tail light is biased to the assembled position by way of a snap-fit movement of the snap hook end.

3. The apparatus according to claim 2, wherein a movement area, within which the snap hook end of the snap hook is movable during achievement and release of the latching connection, is delimited by a stop surface on a vehicle body side.

4. The apparatus according to claim 1, wherein the tail light is additionally fixed in the assembled position by way of at least two screw connections.

5. The apparatus according to claim 4, wherein at least one of the screw connections at one end of the tail light, at a location where the latching connection is also arranged, enables a fixation in a vehicle height direction.

6. The apparatus according to claim 1, wherein the tail light comprises a centering body projecting in a longitudinal vehicle direction, which, in addition to having a cruciform cross-section, is equipped with a stop surface that is employed in the longitudinal vehicle direction.

7. The apparatus according to claim 6, wherein the centering body is positioned on a same side of the tail light as the latching connection.

8. A vehicle body comprising the tail light and the apparatus of claim 1.

9. A motor vehicle comprising the vehicle body of claim 8.

10. The apparatus according to claim 1, wherein the holding fork comprises a bifurcated end defining two prongs and a recess disposed between the two prongs, wherein an assembly body of the vehicle body is positionable within the recess to enable pivoting of the tail light about the assembly body.

11. The apparatus according to claim 1, wherein the holding fork and the latching connection are disposed at opposite ends of the tail light.

12. The apparatus according to claim 1, wherein the latching connection is established upon moving the tail light toward the vehicle body in a longitudinal direction of the motor vehicle.

13. The apparatus according to claim 12, wherein the tail light is held on the vehicle body by the holding fork in the limited pivotable manner about a vertical axis that is orthogonal to the longitudinal direction of the motor vehicle.

14. A method for releasably attaching a tail light to a vehicle body of a motor vehicle, said method comprising:
connecting the tail light on the vehicle body in a limited pivotable manner during assembly using a holding fork disposed at one end of the tail light;
connecting the tail light to the vehicle body in an interlocking manner on at least two interlocking points;
connecting an opposite end of the tail light to the vehicle body by way of at least one latching connection, in addition to the interlocking connection points, in order to establish the tail light in an assembled position in all spatial directions, wherein the latching connection comprises a snap hook extending from the vehicle body and movable with a snap hook end to either establish or release the latching connection; and
following the connecting steps, fixing the tail light to the vehicle body in the assembled position using attachment means.

15. The method of claim 14, wherein the attachment means are screws.

16. The method according to claim 14, wherein the holding fork comprises a bifurcated end defining two prongs and a recess disposed between the two prongs, wherein an assembly body of the vehicle body is positionable within the recess to enable pivoting of the tail light about the assembly body.

17. The method according to claim 14, wherein the latching connection is established upon moving the tail light toward the vehicle body in a longitudinal direction of the motor vehicle.

18. The method according to claim 17, wherein the tail light is held on the vehicle body by the holding fork in the limited pivotable manner about a vertical axis that is orthogonal to the longitudinal direction of the motor vehicle.

19. The method according to claim 14, wherein the tail light comprises a centering body projecting in a longitudinal vehicle direction, which, in addition to having a cruciform cross-section, is equipped with a stop surface that is employed in a longitudinal direction of the motor vehicle, and wherein the centering body is positioned on a same side of the tail light as the latching connection.

* * * * *